(12) United States Patent
Eljaouhari et al.

(10) Patent No.: US 10,648,603 B2
(45) Date of Patent: *May 12, 2020

(54) BRANCH FITTING FOR REDUCING STRESS CAUSED BY ACOUSTIC INDUCED VIBRATION

(71) Applicant: Bechtel Oil, Gas & Chemicals, Inc., Houston, TX (US)

(72) Inventors: Ismat Eljaouhari, Sugar Land, TX (US); Yuqing Liu, Sugar Land, TX (US); Philip Diwakar, Sugar Land, TX (US); Dan Lin, Houston, TX (US); Ajay Prakash, San Ramon, CA (US)

(73) Assignee: Bechtel Oil, Gas and Chemicals, Inc., Houston, TX (US)

( * ) Notice: Subject to any disclaimer, the term of this patent is extended or adjusted under 35 U.S.C. 154(b) by 75 days.

This patent is subject to a terminal disclaimer.

(21) Appl. No.: 16/011,202

(22) Filed: Jun. 18, 2018

(65) Prior Publication Data

US 2018/0299056 A1  Oct. 18, 2018

Related U.S. Application Data

(63) Continuation of application No. 16/063,597, filed as application No. PCT/US2018/012573 on Jan. 5, 2018.

(Continued)

(51) Int. Cl.
*F16L 55/04* (2006.01)
*F28F 9/02* (2006.01)
(Continued)

(52) U.S. Cl.
CPC .............. *F16L 55/043* (2013.01); *F16L 41/04* (2013.01); *F16L 41/084* (2013.01); *F22B 37/104* (2013.01); *F28F 9/0248* (2013.01);
*F28F 21/082* (2013.01); *F15D 1/02* (2013.01); *F28F 2225/08* (2013.01); *F28F 2265/16* (2013.01)

(58) Field of Classification Search
CPC ......... F16L 41/04; F16L 41/08; F16L 41/082; F16L 47/26; F16L 47/28; F16L 47/32; F16L 47/36
USPC ......... 285/183, 197, 222; 381/340; 181/175; 116/3, 59, 137 R; 138/109, DIG. 11
See application file for complete search history.

(56) References Cited

U.S. PATENT DOCUMENTS 2,065,524 A   12/1936  Groeniger
2,791,450 A   5/1957   Hombach
(Continued)

FOREIGN PATENT DOCUMENTS

GB            445045 A    4/1936

OTHER PUBLICATIONS

Shane Thomas; International Search Report and Written Opinion; PCT Application No. PCT/US18/12573; dated Apr. 30, 2018; 17 pages; USPTO; Alexandria, Virginia.
(Continued)

*Primary Examiner* — Aaron M Dunwoody
(74) *Attorney, Agent, or Firm* — Crain, Caton and James

(57) ABSTRACT

A contoured branch fitting for reducing stress in a header pipe caused by acoustic induced vibration that includes a maximum width, a maximum length, a thickness that is greater along the maximum length and a constant radius between the branch connection and the header connection.

15 Claims, 5 Drawing Sheets

Related U.S. Application Data

(60) Provisional application No. 62/443,081, filed on Jan. 6, 2017.

(51) Int. Cl.
  *F28F 21/08* (2006.01)
  *F22B 37/10* (2006.01)
  *F16L 41/08* (2006.01)
  *F16L 41/04* (2006.01)
  *F15D 1/02* (2006.01)

(56) References Cited

U.S. PATENT DOCUMENTS

| | | | |
|---|---|---|---|
| 3,920,271 A | 11/1975 | Bluestone | |
| 3,997,020 A * | 12/1976 | Busnel | E04B 1/84 |
| | | | 181/175 |
| 4,686,928 A * | 8/1987 | Weisenberger | G10K 5/00 |
| | | | 116/137 R |
| 4,744,505 A | 5/1988 | Calleson | |
| 5,275,236 A | 1/1994 | Le Gauyer | |
| 5,342,470 A | 8/1994 | Meirana | |
| 6,343,134 B1 * | 1/2002 | Czerwinski | H04R 1/26 |
| | | | 381/182 |
| 6,389,144 B1 * | 5/2002 | Lee | H04R 1/345 |
| | | | 381/340 |
| 7,708,112 B2 * | 5/2010 | Geddes | H04R 1/30 |
| | | | 181/152 |
| 7,936,892 B2 * | 5/2011 | Werner | H04R 1/345 |
| | | | 181/177 |
| 8,199,953 B2 * | 6/2012 | Buccafusca | G10K 11/025 |
| | | | 381/340 |
| 2009/0065185 A1 | 3/2009 | Jekerle | |
| 2011/0268305 A1 * | 11/2011 | Buccafusca | G10K 11/025 |
| | | | 381/340 |
| 2014/0093111 A1 * | 4/2014 | Jankovsky | G10K 11/025 |
| | | | 381/340 |

OTHER PUBLICATIONS

Vijaya Mathe, Examination Report No. 1, Australian Patent Application No. 2018205213, dated Nov. 21, 2019, 3 pages, Australian Government IP Australia, Australia.

James Burnley PHD, Response to Exam Report, Australian Patent Application No. 2018205213, dated Dec. 24, 2019, 34 pages, Phillips Ormonde Fitzpatrick Intellectual Property, Australia.

* cited by examiner

BRANCH FITTING FOR REDUCING STRESS CAUSED BY ACOUSTIC INDUCED VIBRATION

CROSS-REFERENCE TO RELATED APPLICATIONS

This application is a Continuation of U.S. application Ser. No. 16/063,597, filed Jun. 18, 2018, which is a U.S. National Stage Application of International Application No. PCT/US18/12573, filed Jan. 5, 2018, which claims priority to U.S. Provisional Application No. 62/443,081, filed Jan. 6, 2017, each of which are incorporated herein by reference.

FIELD OF THE DISCLOSURE

The following disclosure generally relates to a branch fitting for reducing stress in a header pipe caused by high frequency vibration such as acoustic induced vibration. More particularly, the following disclosure relates to reducing stress in a header pipe caused by acoustic induced vibration through a branch fitting that includes a maximum width, a maximum length, and a constant radius between the branch connection and the header connection.

BACKGROUND

Process piping is traditionally designed to withstand process pressures and temperatures, as well as any external static and dynamic loads. Advances in metallurgy are permitting the use of thinner wall pipe that allows for more flexible pipework, but at the expense of a higher stress concentration at the branch fittings. A thinner wall pipe with a higher stress concentration at the branch fittings can lead to designs that are more susceptible to a risk of fatigue failure, particularly in systems utilizing pressure-reducing devices with a large pressure drop and large flow rate that act as a loud sound source. The loud sound sources can produce high frequency (acoustically induced) vibration (AIV) of the header pipe, which can potentially lead to fatigue failures at piping discontinuities (e.g. branch fittings) within several minutes or hours.

AIV in piping systems with vapor service is generally caused by acoustic energy created from pressure reducing devices. Examples of such devices include control valves, depressurizing valves, restriction orifices, and pressure safety valves. The typical frequency range of dominant acoustic energy is between 500 and 2000 Hz. The high frequency sound can excite and resonate with the circumferential modes of vibration of header pipe, thus amplifying stress concentrations and create the potential for fatigue failures at piping discontinuities. To mitigate the potential for catastrophic AIV fatigue failure, contoured branch fittings have increasingly been specified for use at branch connections in susceptible piping systems. In the past three decades, contoured branch fittings have eliminated sharp discontinuities at the branch connection, thereby reducing stress concentration and the associated stress intensification factor (SIF).

Contoured branch fittings are, however, primarily designed to resist internal pressure and to reduce stresses under thermal and mechanical loads. Their effectiveness in mitigating AIV is, however, limited. When the anticipated sound power level exceeds the design limit of a contoured branch fitting, the typical solution is to replace the pipe with thicker pipe and associated branch fittings. Other solutions include reduction of sound level at the source, such as splitting the sound energy thru parallel paths or reducing the sound by use of low noise valve trim. These solutions significantly increase the total installation cost, and in many cases can lead to schedule delays.

BRIEF DESCRIPTION OF THE DRAWINGS

The detailed description is described with reference to the accompanying drawings, in which like elements are referenced with like reference numbers, and in which.

DETAILED DESCRIPTION OF THE ILLUSTRATIVE EMBODIMENTS

The subject matter disclosed herein is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will thus, be or become apparent to one of ordinary skill in the art upon examination of the following figures and detailed description. It is intended that all such features and advantages be included within the scope of the disclosed embodiments. Further, the illustrated figures are only exemplary and are not intended to assert or imply any limitation with regard to the environment, architecture, design, or process in which different embodiments may be implemented. Thus, the embodiments disclosed herein may be implemented in many different piping systems to achieve the results described herein. To the extent that temperatures and pressures are referenced in the following description, those conditions are merely illustrative and are not meant to limit the disclosure.

The contoured branch fitting embodiments disclosed herein overcome one or more of the prior art disadvantages by reducing stress in a header pipe caused by acoustic induced vibration through a branch fitting that includes a maximum width, a maximum length, and a constant radius between the branch connection and the header connection.

In one embodiment, a contoured branch fitting is disclosed, comprising: i) a maximum width (MW); ii) a maximum length (ML), wherein the ML is at least 1.10 times longer than the MW; iii) a maximum height (MH); iv) a constant inside radius (BRi) from a branch connection for the branch fitting to a header connection for the branch fitting; and v) a constant outside radius (BRo) from the branch connection to the header connection.

In another embodiment, a method for reducing stress in a header pipe caused by acoustic induced vibration is disclosed, comprising: i) transmitting a fluid through a header pipe connected to a branch fitting, the branch fitting including a constant inside radius and a constant outside radius from a branch connection for the branch fitting to a header connection for the branch fitting; and ii) maintaining a sound power level of at least 168 dB in the header pipe, wherein a ratio of an inside diameter of the header pipe and a thickness of the header pipe is at least 30.

Figure 1:
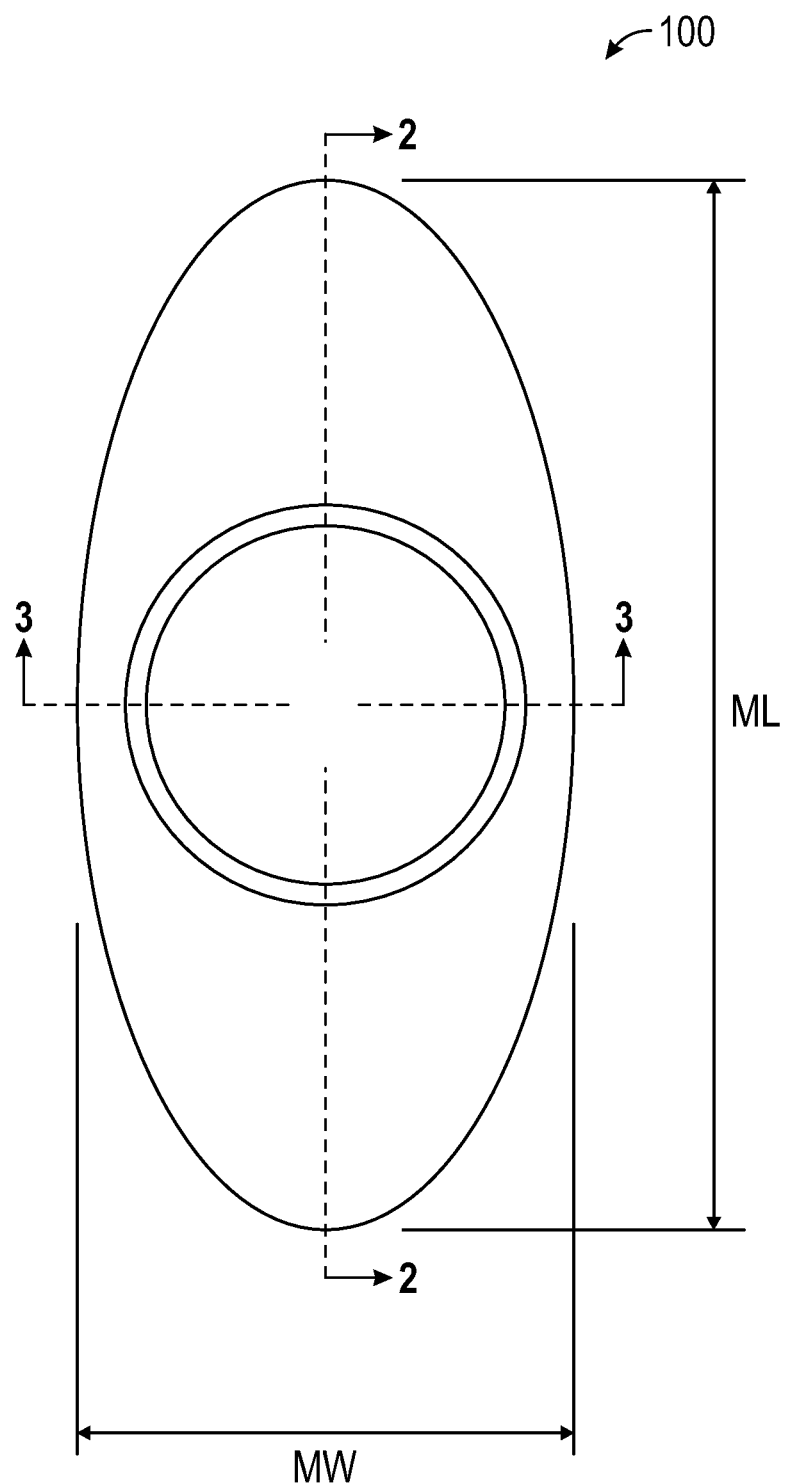
FIG. 1 is a plan view for one embodiment of a contoured branch fitting according to the present disclosure illustrating a maximum width and a maximum length of the branch fitting.

Referring now to FIG. 1, a plan view illustrates a maximum width MW and a maximum length ML for one embodiment of a contoured branch fitting 100 according to the present disclosure. The maximum length ML is at least 1.10 times longer than the maximum width MW. The branch fitting 100 may be used on any size header pipe, however, preferably having a diameter between 3 inches and 48 inches. The branch fitting 100 may be forged from any sustainable metal however, preferably includes A105N carbon steel, A350 LF2 carbon steel or A182 F304/304L stainless steel to match the header pipe material. The branch fitting 100 is welded in place using a butt weld.

Figure 2:
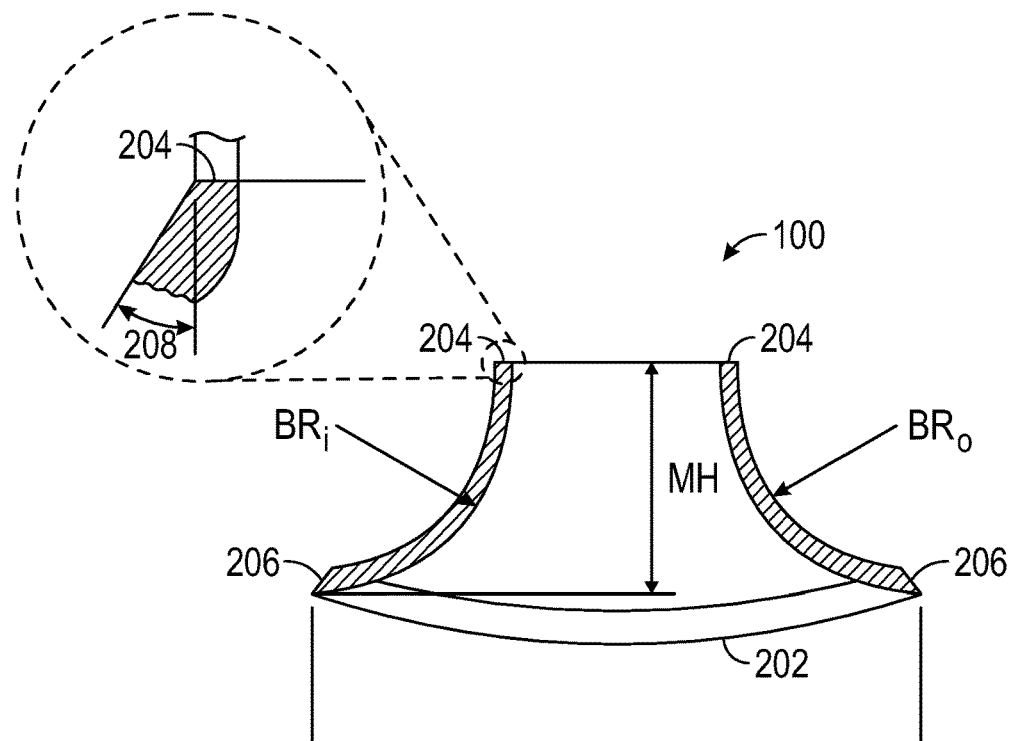
FIG. 2 is a cross-sectional side-view of the branch fitting along 2-2 in FIG. 1 illustrating the branch fitting attached to a header pipe.

Referring now to FIG. 2, a cross-sectional side-view of the branch fitting 100 along 2-2 in FIG. 1 illustrates the branch fitting 100 attached to a header pipe 202. The branch fitting 100 includes a maximum height MH, an inside radius $BR_i$ and an outside radius $BR_o$. The inside radius $BR_i$ and the outside radius $BR_o$ are constant between a branch connection 204 for the branch fitting 100 and a header connection 206 for the branch fitting 100. The outside radius $BR_o$ is preferably at least half the size of the inside radius $BR_i$ but no greater than 3 times the size of the inside radius $BR_i$. The maximum length ML of the branch fitting 100 is preferably no greater than three times the maximum height MH. And, the maximum height MH of the branch fitting 100 is preferably no greater than the outside radius $BR_o$. The maximum height MH of the branch fitting 100 is also preferably 1.1 times the size of the inside radius $BR_i$ but no greater than 1.5 times the size of the inside radius $BR_i$. The maximum length ML of the branch fitting 100 is at least 2.5 times the size of the outside radius $BR_i$ but no greater than 4 times the size of the outside radius $BR_o$.

Figure 3:
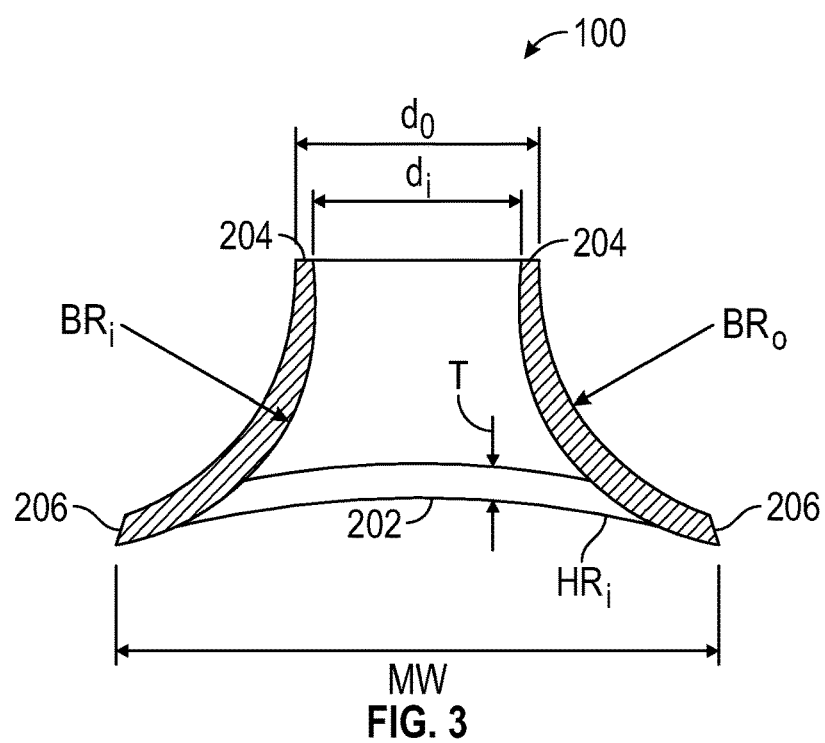
FIG. 3 is a cross-sectional front-view of the branch fitting along 3-3 in FIG. 1 illustrating the branch fitting attached to the header pipe.

Referring now to FIG. 3, a cross-sectional side-view of the branch fitting 100 along 3-3 in FIG. 1 illustrates the branch fitting 100 attached to the header pipe 202. The branch fitting 100 at the branch connection 204 includes a predetermined outside diameter $d_o$ and a predetermined inside diameter $d_i$. The header pipe 202 at the header connection 206 includes a predetermined inside radius $HR_i$ and a predetermined thickness T. The inside radius $BR_i$ is preferably at least half the size of the outside diameter $d_o$ but no greater than 1.5 times the size of the outside diameter $d_o$. The maximum width MW may be calculated using equation (1): $MW=(d_o-0.04(d_o^2))$ $(2+0.14(HR_i+T)-0.0024(HR_i+T)^2)$.

Figure 4:
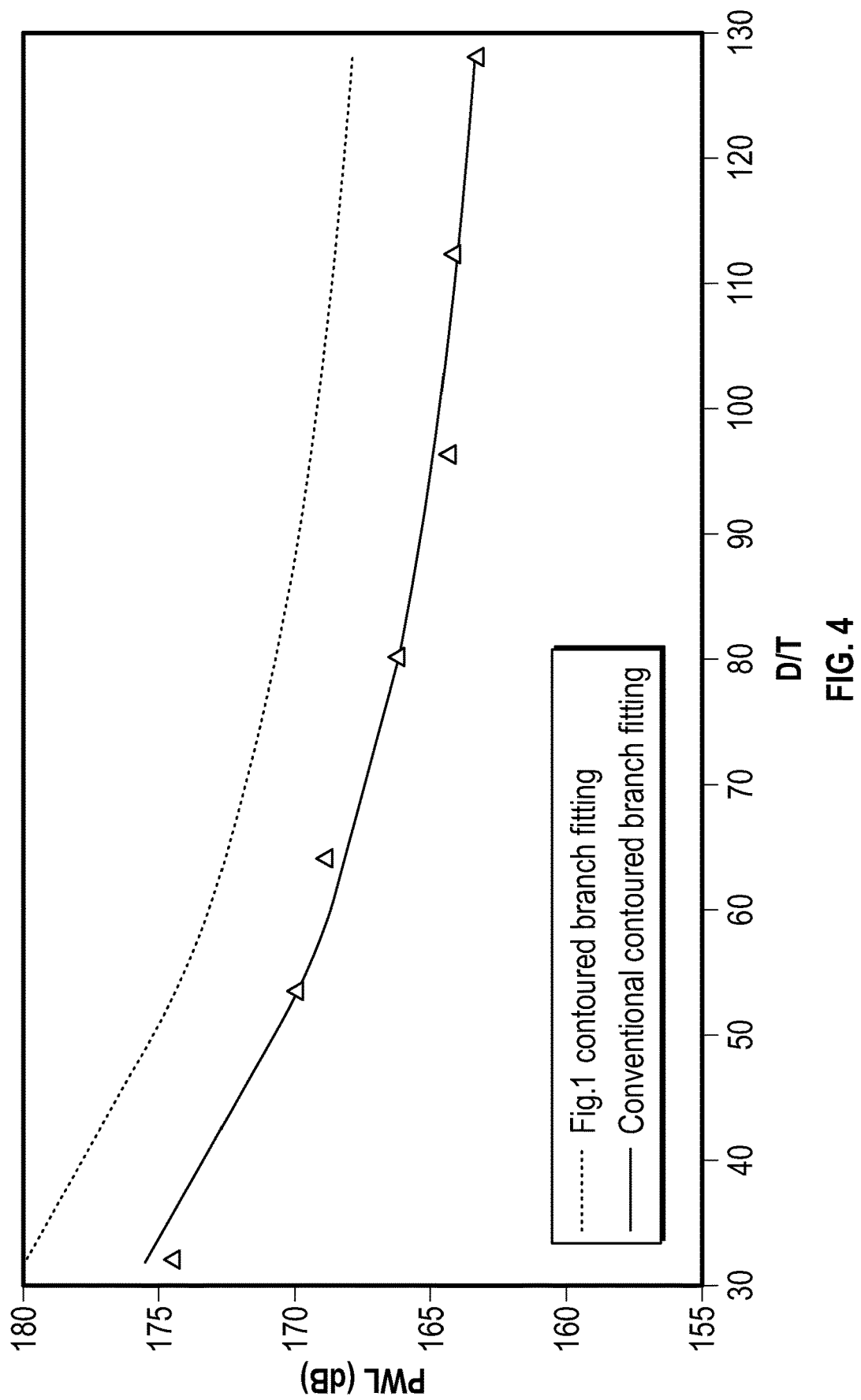
FIG. 4 is a graphical display comparing simulated sound power levels in the same header pipe for a contoured branch fitting according to FIG. 1 and a conventional contoured branch fitting as a function of a ratio between the inside diameter of the header pipe and the thickness of the header pipe.

The branch fitting 100 reduces stress in the header pipe 202 at the header connection 206 caused by AIV when fluid is transmitted through the header pipe 202 connected to the branch fitting 100 because the inside radius $BR_i$ and the outside radius $BR_o$ are constant between the branch connection 204 and the header connection 206. In this manner, a sound power level of at least 168 dB may be maintained in the header pipe 202 when a ratio between the inside diameter HRi of the header pipe 202 and the thickness T of the header pipe 202 is at least 30. The stress caused by shell mode vibration, such as AIV, is proportional to this ratio. In FIG. 4, a graphical display illustrates a comparison of simulated sound power levels (PWL) in the same header pipe attached to a contoured branch fitting according to FIG. 1 and a conventional contoured branch fitting as a function of a ratio between the inside diameter of the header pipe and the thickness of the header pipe (D/T). For the contoured branch fitting according to FIG. 1, the sound power level may be maintained at slightly above 180 dB when the ratio is 32. And, the sound power level may be maintained at 168 dB when the ratio is 128. By comparison, the sound power levels for the contoured branch fitting according to FIG. 1 are significantly higher than the sound power levels for the conventional contoured branch fitting over a broad range of ratios.

Branch connections with rounded edges are successful in addressing flow-induced-acoustic-resonance (AR) issues by stabilizing the shear layer thereby, reducing vortex excitation. The inside radius $BR_i$ of the curvature is thus, designed first in order to minimize flow-induced AR. Then, the outside radius $BR_o$ of the curvature is designed in order to reduce AIV and internal static pressure. Once the inside radius $BR_i$ and the outside radius $BR_o$ are designed, the maximum width MW is determined using equation (1) because the curvature of the contoured branch fitting needs to be tangent to the curvature of the header pipe. Once the inside radius $BR_i$, the outside radius $BR_o$, and the maximum width MW are determined, the maximum height MH and the maximum length ML are determined based on the outside diameter $d_o$ of the branch fitting 100 at the branch connection 204. A slant angle 208 is selected to reduce the maximum height MH and the maximum length ML. Based on these design criteria, the maximum height is 1.68 times the outside diameter $d_o$ of the branch fitting 100 at the branch connection 204. If the outside diameter $d_o$ of the branch fitting 100 at the branch connection 204 is 20 inches, then the maximum height MH could be about 34 inches. Using a slant angle between 10 and 20 degrees can therefore, significantly reduce the maximum height MH and the maximum length ML without compromising the reduction of stress in the header pipe 202 caused by AIV. As demonstrated herein, the unique design of the branch fitting 100 reduces stress in the header pipe 202 caused by AIV when fluid is transmitted through the header pipe 202.

EXAMPLES

Figure 5:
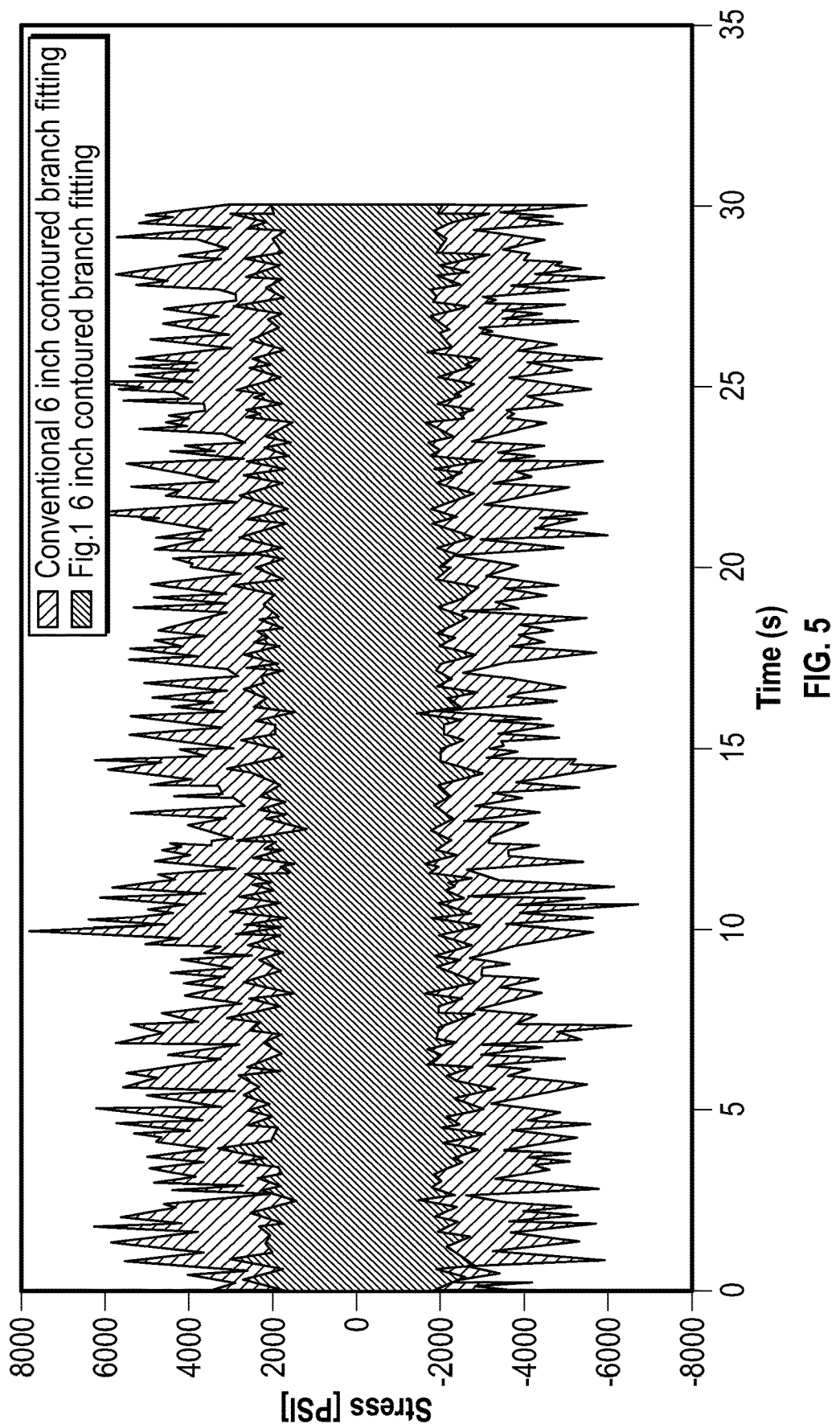
FIG. 5 is a graphical display comparing real stress measurements over time for a six (6) inch contoured branch fitting according to FIG. 1 and a conventional six (6) inch contoured branch fitting attached to the same header pipe.
Figure 6:
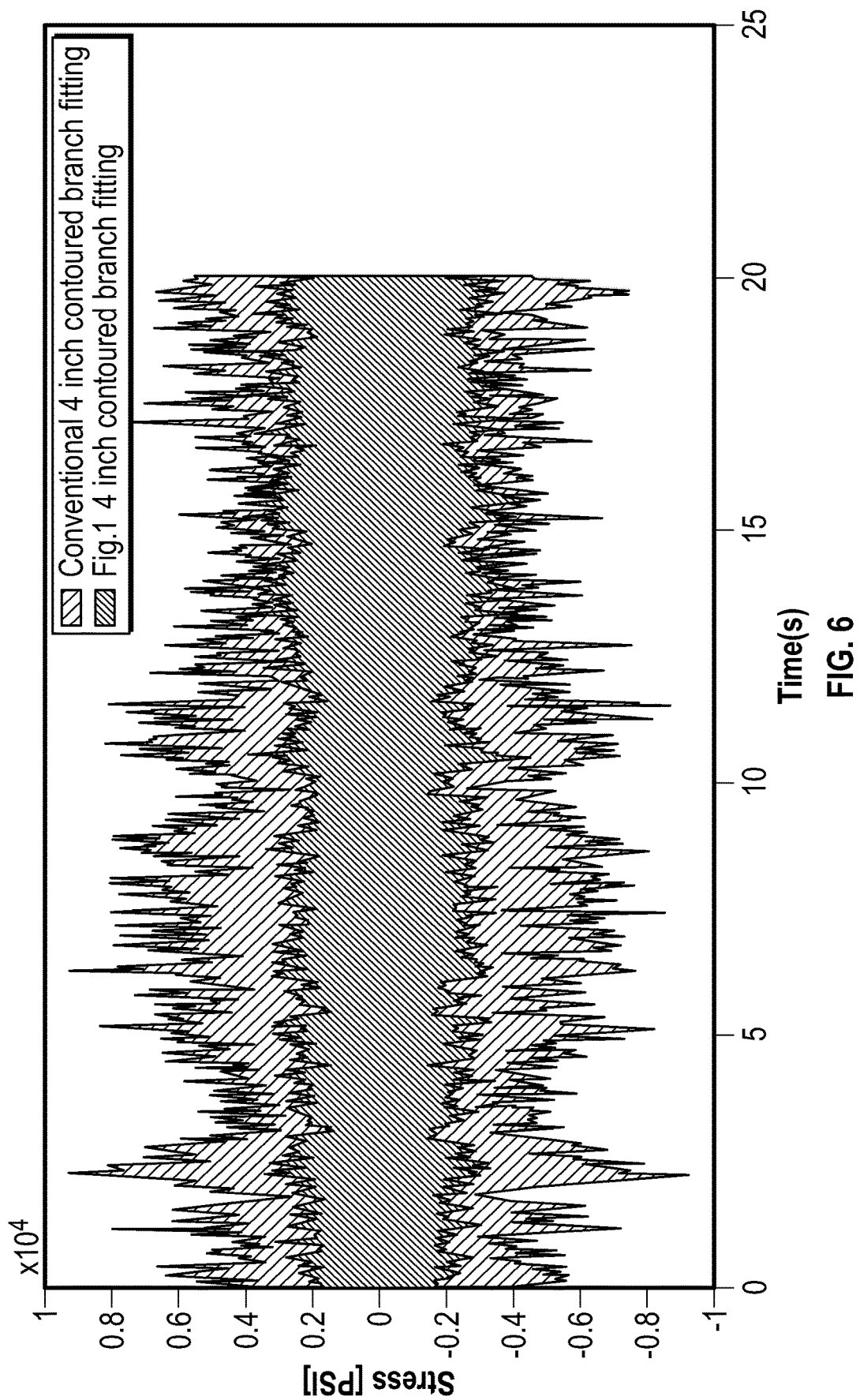
FIG. 6. is a graphical display comparing real stress measurements over time for a four (4) inch contoured branch fitting according to FIG. 1 and a conventional four (4) inch contoured branch fitting attached to the same header pipe

In FIG. 5, a graphical display is illustrated comparing real stress measurements over time for a four (4) inch contoured branch fitting according to FIG. 1 and a conventional four (4) inch contoured branch fitting attached to the same header pipe. In FIG. 6, a graphical display is illustrated comparing real stress measurements over time for a four (4) inch contoured branch fitting according to FIG. 1 and a conventional four (4) inch contoured branch fitting attached to the same header pipe. In each example, an average pressure of approximately 1580 psig was recorded upstream of the relief valve during pseudo steady-state conditions. To maintain this upstream pressure, an average flowrate of approximately 84 mmscfd was maintained-resulting in a sound power level of approximately 163 dB. As demonstrated by these examples, the contoured branch fitting according to FIG. 1 results in less stress than the conventional contoured branch fitting during the same AIV. In FIG. 5, an average stress reduction of 25% to 50% was recoded between the contoured branch fitting according to FIG. 1 and the conventional contoured branch fitting. In FIG. 6, an average stress reduction of 30% to 50% was recoded between the contoured branch fitting according to FIG. 1 and the conventional contoured branch fitting.

The contoured branch fittings disclosed herein accommodate higher sound power levels along with all design loading, without compromising project cost and schedule. Besides reducing stress in the header pipe caused by AIV, the contoured branch fittings also avoid vortices, another fluid structure interaction issue commonly found in piping systems. The contoured branch fittings thus, reduce stress concentration and vortex shedding frequencies, while adhering to industry codes and standard requirements. The contoured branch fittings provide an integrated solution to piping vibration that will help engineering and construction projects with cost and schedule completions, and avoid expensive re-work on existing projects.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A branch fitting, which comprises:
   a maximum width (MW);
   a maximum length (ML), wherein the ML is at least 1.10 times longer than the MW;
   a maximum height (MH);
   a constant inside radius ($BR_i$) from a branch connection for the branch fitting to a header connection for the branch fitting; and
   a constant outside radius ($BR_o$) from the branch connection to the header connection.

2. The branch fitting of claim 1, wherein the ML is no greater than three times the MH.

3. The branch fitting of claim 1, wherein the branch fitting at the branch connection includes an outside diameter ($d_o$) and a header pipe at the header connection includes an inside radius ($HR_i$) and a thickness (T).

4. The branch fitting of claim 3, wherein the $BR_i = X(d_o)$ and X is at least 4.5.

5. The branch fitting of claim 1, wherein the $BR_o = Y(BR_i)$ and Y is at least 0.5.

6. The branch fitting of claim 5, wherein Y is no greater than 3.0.

7. The branch fitting of claim 1, wherein the MH is no greater than the $BR_o$.

8. The branch fitting of claim 1, wherein the MH=A(BRi) and A is at least 1.1.

9. The branch fitting of claim 8, wherein A is no greater than 1.5.

10. The branch fitting of claim 1, wherein the $ML=Z(BR_o)$ and Z is at least 2.5.

11. The branch fitting of claim 10, wherein Z is no greater than 4.0.

12. A method for reducing stress in a header pipe caused by acoustic induced vibration, which comprises:
    transmitting a fluid through the header pipe connected to a branch fitting, the branch fitting including a constant inside radius and a constant outside radius from a branch connection for the branch fitting to a header connection for the branch fitting; and
    maintaining a sound power level of at least 168 dB in the header pipe, wherein a ratio of an inside diameter of the header pipe and a thickness of the header pipe is at least 30.

13. The method of claim 12, wherein the ratio is 32 and the sound power level is 180 dB.

14. The method of claim 12, wherein the ratio is 128 and the sound power level is 168 dB.

15. The branch fitting of claim 4, wherein X is no greater than 1.5.

* * * * *